No. 643,739. Patented Feb. 20, 1900.
N. H. BLOOM & J. F. LOOS.
HARROW.
(Application filed Oct. 14, 1899.)
(No Model.)
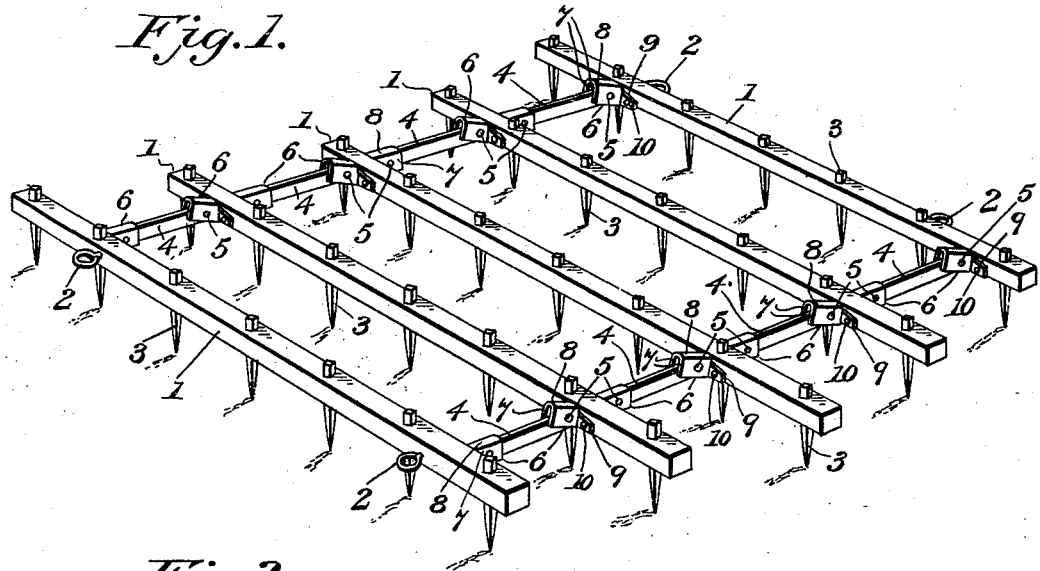
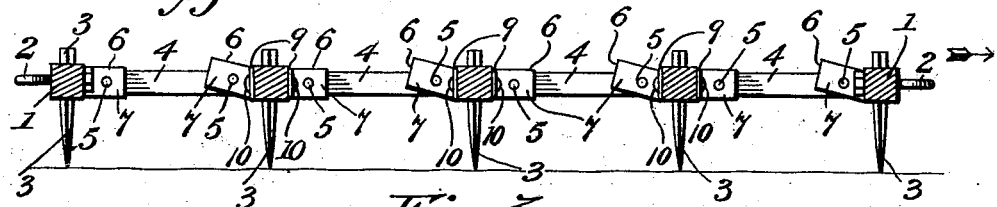
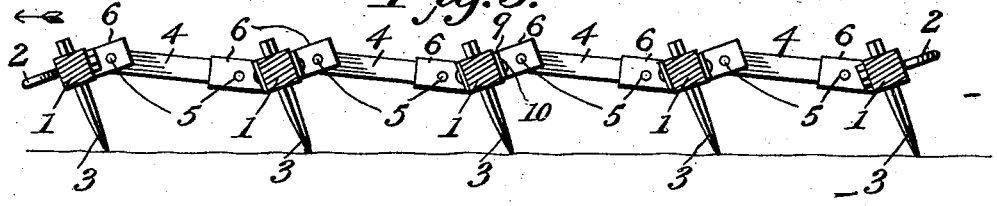
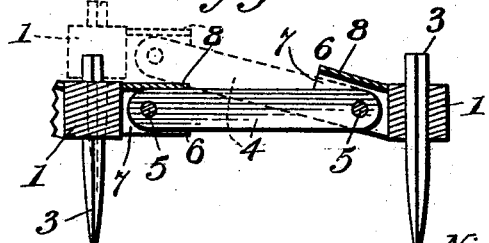
Nicklas H. Bloom
and John F. Loos Inventors
Witnesses
Edwin G. McKee
R. M. Smith
By
Attorney

UNITED STATES PATENT OFFICE.

NICKLAS H. BLOOM AND JOHN F. LOOS, OF NASHUA, IOWA.

HARROW.

SPECIFICATION forming part of Letters Patent No. 643,739, dated February 20, 1900.

Application filed October 14, 1899. Serial No. 733,650. (No model.)

*To all whom it may concern:*

Be it known that we, NICKLAS H. BLOOM and JOHN F. LOOS, citizens of the United States, residing at Nashua, in the county of Chickasaw and State of Iowa, have invented a new and useful Harrow, of which the following is a specification.

This invention relates to harrows; and the object in view is to provide a harrow which has draft devices at both ends, so that it may be drawn in either direction, the harrow-bars being so connected that when the harrow is drawn from one end the harrow-bars will be held with their teeth straight or projecting vertically downward and when drawn from the opposite end the harrow-bars will be tilted, so as to give a rearward inclination to the harrow-teeth. By such arrangement the harrow is adapted to be used either in soft or loamy soil or in sticky and clayey soil. The harrow-bars and their teeth automatically adjust themselves to the proper angles and remain at such angles as the harrow is drawn over the ground. Other subordinate objects and advantages of the invention will appear in the course of the ensuing description.

The invention consists in a harrow embodying certain novel features and details of construction and arrangement of parts, as hereinafter fully described, illustrated in the drawings, and incorporated in the claims.

In the accompanying drawings, Figure 1 is a perspective view of a harrow constructed in accordance with this invention, showing the teeth pointing straight downward. Fig. 2 is a longitudinal section through the same. Fig. 3 is also a longitudinal section showing the harrow bars and teeth tilted rearwardly. Fig. 4 is a detail section through two adjacent harrow-bars, showing the coöperation between the clips and the connecting-links and also showing the dotted-line position of the rearmost harrow-bar of the pair when rocked or tilted upward upon striking an obstruction.

Similar numerals of reference desigate corresponding parts in all the figures of the drawings.

The harrow contemplated in this invention comprises a plurality of toothed harrow-bars 1, arranged at equal distances apart and in parallel relation to each other. The end or front and rear harrow-bars are provided with draft devices 2, shown for convenience in the form of eyebolts, to which the draft-animals may be hitched, thus enabling the harrow to be drawn from either end. The harrow-bars instead of being arranged one exactly in front of another are disposed irregularly, or, in other words, the second harrow-bar projects at one end beyond the corresponding end of the front harrow-bar, and the third harrow-bar likewise projects beyond or overlaps the second harrow-bar. The harrow-bars may thus be said to be arranged in zigzag order, the object of which is to prevent the harrow-teeth 3 from coming in longitudinal alinement with each other, thus facilitating the pulverization or breaking up of the soil and rendering the harrow as a whole easier of draft.

The several harrow-bars 1 are connected by links 4. Two or more links may be interposed between each pair of harrow-bars, and each link preferably consists of a straight metal bar or rod, the ends of which are provided with openings to receive bolts, rivets, or other suitable fasteners 5, which pass also through clips 6, secured to the adjacent faces of the harrow-bars, whereby each link is pivotally connected at its opposite ends to clips on the harrow-bars, and therefore pivotally connected to the bars themselves. Each clip comprises a U-shaped body portion comprising parallel ears or flanges 7, between which the end of the link is pivotally received. These flanges or ears are connected at their upper edges, as shown at 8, and the connecting portion 8 constitutes a shoulder or abutment, against which the link strikes, thereby limiting the relative movement of the clip in one direction. Each clip is also provided with laterally and oppositely projecting ears 9, having openings to receive screws or other fasteners 10, by means of which each clip is secured to its respective harrow-bar. The clips arranged along one side of each harrow-bar are the same in construction as those arranged along the opposite side of said bar, with the exception that the ears and connecting portion of those on one side are pitched at an angle or inclined from a horizontal plane upward at an angle of, say, forty-five degrees, more or less, according to the desire of the manufacturer and the requirements of the farmer. In both clips, however, the connecting portion of the ears or flanges forms a stop-shoulder which coöperates with the upper side or edge of the connecting-link.

When the harrow is drawn from one end, the normally-horizontal shoulders of the clips will coöperate with the links and serve to hold the harrow-bars with their teeth projecting straight downward, as shown in Figs. 1 and 2. When the draft-animals are attached to the opposite end of the harrow, the harrow-teeth by reason of their contact with the soil will be canted or tilted rearwardly, and the extent to which the teeth may tilt in a rearward direction will be limited by the normally-inclind shoulders of the clips coming in contact with the connecting-links, as shown in Fig. 3. Figs. 1 and 2 illustrate the position of the parts when the harrow is used in loamy or easily-worked soil, and Fig. 3 illustrates the position the parts assume when the harrow is drawn from the opposite end and when in use upon clayey or sticky soil, the latter arrangement enabling the harrow-teeth to clear themselves, thus obviating clogging the teeth in a manner clearly understood by those familiar with the art to which this invention appertains.

Owing to the particular form of connection between the several harrow-bars should the teeth of any particular harrow-bar strike against an unyielding obstruction the said harrow-bar and the others in rear thereof may yield in an upward direction, so as to pass over the obstruction, and after the obstruction has been passed the harrow-bars, with their teeth, will assume their normal working positions, owing to the pivotal connection and shouldered engagement between the bars and links. The above is true whether the harrow is drawn from one end or the other.

The joint between the links and bars comprised by the links and clips is in the nature of a knuckle-joint, the shoulders of one set of clips or knuckles being normally horizontal and the corresponding shoulders of the other clips being normally inclined.

From the foregoing it is thought that the construction, operation, and many advantages of the herein-described invention will be apparent to those skilled in the art without further description, and it will be understood that changes in the size, shape, proportion, and minor details of construction may be resorted to without departing from the spirit or sacrificing any of the advantages of the invention.

Having thus described the invention, what we claim as new, and desire to secure by Letters Patent, is—

1. In a harrow, harrow-bars, in combination with connecting-links, and clips on the bars having the links pivotally connected thereto and provided with link-engaging shoulders disposed at an angle to each other, substantially as described.

2. In a harrow, harrow-bars, in combination with connecting-links, and clips on the bars having the links pivotally connected thereto and provided with link-engaging shoulders, the shoulders at one side of each bar being disposed at an angle to the shoulders at the opposite side, substantially as described.

3. In a harrow, harrow-bars, in combination with connecting-links, and clips on the bars to which the links are pivoted, the clips at corresponding ends of the links having normally-horizontal stop-shoulders and the clips at the opposite ends having normally-inclined stop-shoulders, substantially as specified.

4. In a harrow, harrow-bars, in combination with connecting-links, and clips on the bars each comprising ears between which the end of a link is pivotally received and a connecting portion extending over the link and forming a limiting-shoulder therefor, substantially as described.

In testimony that we claim the foregoing as our own we have hereto affixed our signatures in the presence of two witnesses.

NICKLAS H. BLOOM.
JOHN F. LOOS.

Witnesses:
CHAS. A. ALLEN,
F. W. KEYES.